US008566580B2

(12) United States Patent
Ben-Itzhak et al.

(10) Patent No.: US 8,566,580 B2
(45) Date of Patent: Oct. 22, 2013

(54) SPLITTING AN SSL CONNECTION BETWEEN GATEWAYS

(75) Inventors: Yuval Ben-Itzhak, Tel-Aviv (IL); Shay Lang, Tel-Aviv (IL); Dmitry Rubinstein, Kfar Netter (IL)

(73) Assignee: Finjan, Inc., New York, NY (US)

( * ) Notice: Subject to any disclaimer, the term of this patent is extended or adjusted under 35 U.S.C. 154(b) by 1447 days.

(21) Appl. No.: 12/178,558

(22) Filed: Jul. 23, 2008

(65) Prior Publication Data

US 2010/0023756 A1    Jan. 28, 2010

(51) Int. Cl.
    *H04L 29/06* (2006.01)
(52) U.S. Cl.
    USPC .................................. 713/156; 726/12; 726/3
(58) Field of Classification Search
    USPC ......................................... 713/156; 726/3, 12
    See application file for complete search history.

(56) References Cited

U.S. PATENT DOCUMENTS

| | | | |
|---|---|---|---|
| 6,963,972 B1* | 11/2005 | Chang et al. ................... 713/153 |
| 2002/0128925 A1* | 9/2002 | Angeles ........................... 705/26 |
| 2004/0015725 A1* | 1/2004 | Boneh et al. .................... 713/201 |
| 2006/0136724 A1* | 6/2006 | Takeshima et al. ............ 713/168 |
| 2007/0038853 A1* | 2/2007 | Day et al. ........................ 713/153 |
| 2008/0060055 A1* | 3/2008 | Lau ..................................... 726/3 |
| 2008/0146240 A1* | 6/2008 | Trudeau ......................... 455/445 |
| 2008/0307219 A1* | 12/2008 | Karandikar .................... 713/153 |
| 2009/0013399 A1* | 1/2009 | Cottrell et al. ................... 726/12 |
| 2009/0178061 A1* | 7/2009 | Sandoval et al. ............. 719/328 |

\* cited by examiner

*Primary Examiner* — Krista Zele
*Assistant Examiner* — James Forman
(74) *Attorney, Agent, or Firm* — Bey & Cotropia PLLC (57) ABSTRACT

A system for secure communication, including a first security computer communicatively coupled with a client computer via an SSL connection, including a certificate creator, for receiving certificate attributes of a server computer certificate and for creating a signed certificate therefrom, and an SSL connector, for performing an SSL handshake with the client computer using the signed certificate created by said certificate creator, and a second security computer communicatively coupled with a server computer via an SSL connection, and communicatively coupled with the first security computer via a non-SSL connection, including an SSL connector, for performing an SSL handshake with the server computer using a signed certificate provided by the server computer, and a protocol appender, for appending attributes of the signed certificate provided by the server computer within a message communicated to the first security computer. A method is also described and claimed.

10 Claims, 8 Drawing Sheets

SPLITTING AN SSL CONNECTION BETWEEN GATEWAYS

FIELD OF THE INVENTION

The field of the present invention is secure network communication.

BACKGROUND OF THE INVENTION

Figure 1A:
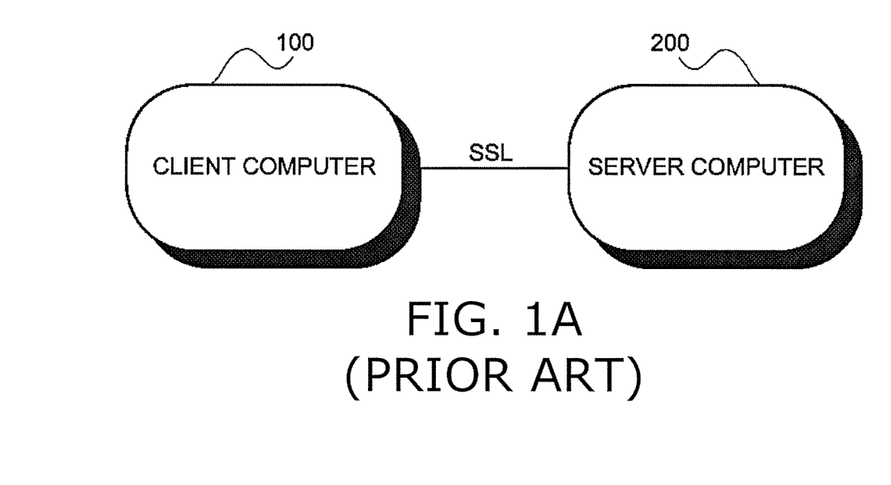
FIG. 1A is a prior art diagram of a client server system using one SSL connection.

Secure Sockets Layer (SSL) is a protocol used to encrypt communication between a client computer and a server computer. In this regard, reference is now made to FIG. 1A, which is a prior art diagram of a client-server system using one SSL connection. The SSL protocol enables a client computer 100 to authenticate a remote server computer 200, by means of signed certificates. The SSL protocol utilizes a handshake procedure to exchange and validate a certificate, prior to establishing an encrypted connection. Generally, the handshake procedure degrades performance and causes latency.

Figure 1B:
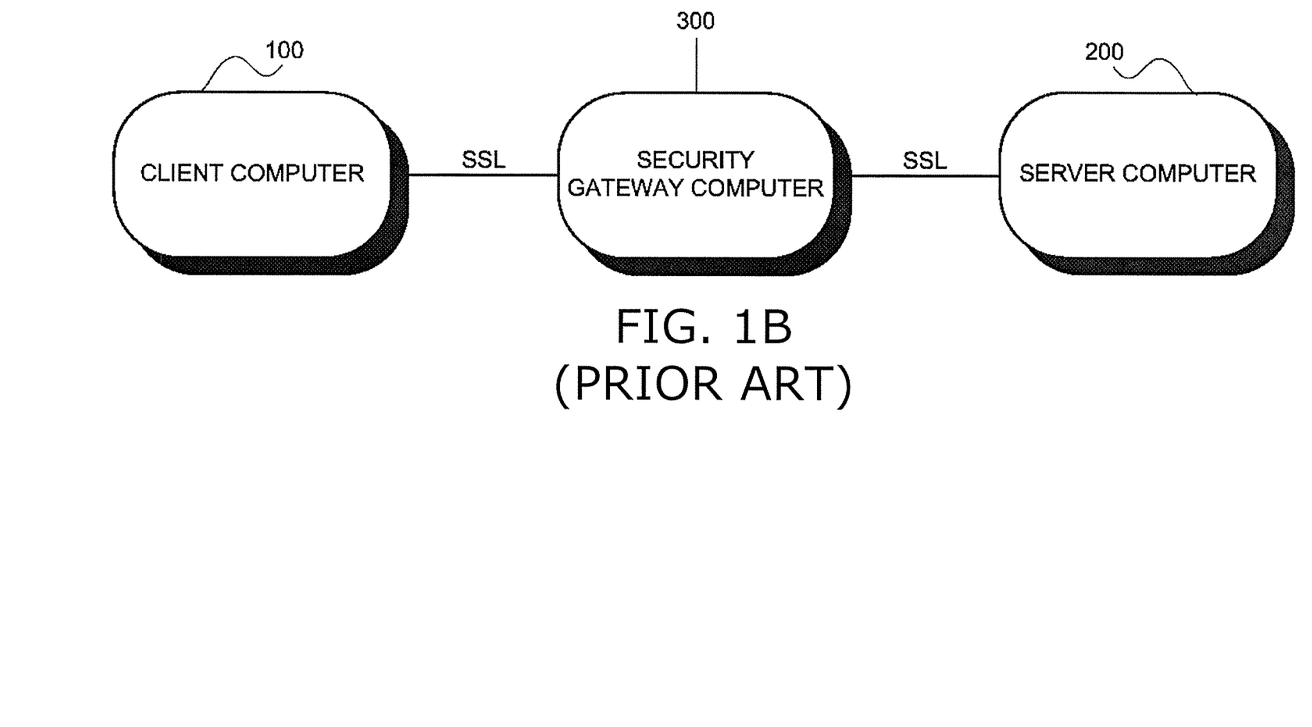
FIG. 1B is a prior art diagram of a client-server system with a security gateway computer, using two SSL connections.

Often a security gateway computer is used to inspect data being communicated between server computer 200 and client computer 100. In this regard, reference is now made to FIG. 1B, which is a prior art diagram of a client-server system with a security gateway computer 300, using two SSL connections. Security gateway computer 300 may detect malicious content and confidential data. As seen in FIG. 1B, the SSL protocol between client computer 100 and server computer 200 is split. Each side of security gateway computer 300 establishes a separate SSL connection. There is an SSL connection between client computer 100 and security gateway computer 300, for which security gateway computer 300 acts as a server; and there is an SSL connection between security gateway 300 and server computer 200, for which security gateway computer 300 acts as a client. The additional SSL handshake required by the additional SSL connection additionally degrades performance and causes additional latency.

Figure 1C:
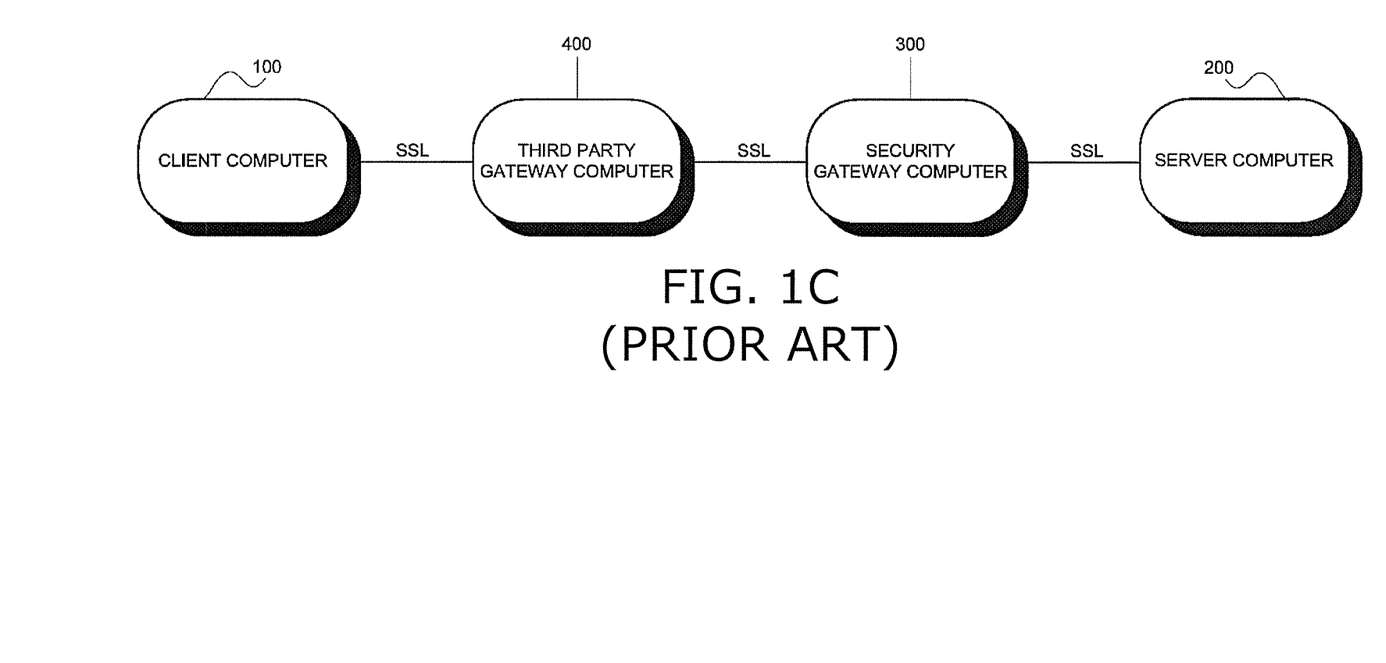
FIG. 1C is a prior art diagram of a client-server system with a security gateway computer and a third party gateway computer, using three SSL connections.

Often security gateway computers operate in conjunction with third party gateway computers, such as content caching gateway computers. In this regard, reference is now made to FIG. 1C, which is a prior art diagram of a client-server system with a security gateway computer 300 and a third party gateway computer 400, using three SSL connections. Third party gateway computer 400 does not inspect the data content transmitted via the SSL connection and, as such, does not need to encrypt the data content. Nevertheless, since third party gateway computer 400 is networked within an SSL connection, it must re-establish the SSL connection on both of its sides. Although the topology of FIG. 1C is technically sound, it has a significant penalty in performance and latency due to the need to perform three SSL handshakes. Moreover, the penalty is magnified if third party gateway computer 400 is replaced with a plurality of third party gateway computers.

It would thus be of advantage to provide a more efficient way to network a security gateway computer with one or more third party gateway computers, when the one or more third party gateway computers do not need to inspect data content.

SUMMARY OF THE DESCRIPTION

Aspects of the present invention relate to a method and system for networking a security gateway computer with one or more third party gateway computers, when the third party gateway computers do not need to inspect the data content they receive and transmit. The third party gateway computers may be, for example, caching gateway computers. Embodiments of the present invention provide a network that requires only two SSL handshakes, regardless of the number of third party gateway computers in the network. In contrast, prior art networks require at least n+2 SSL handshakes, where n is the number of third party gateway computers in the network.

Embodiments of the present invention use two security gateway computers that surround the third party gateway computers. A permanent encrypted tunnel/pipe is established between the two security gateway computers.

To support SSL certificate validation of a server computer by a client computer, the security gateway computer adjacent to the client computer generates certificates with credential attributes of the server computer. Additionally, the security gateway computer adjacent to the client computer maintains an up-to-date certificate cache, so that the same certificate may be used for client requests to the same server computer.

There is thus provided in accordance with an embodiment of the present invention a system for secure communication, including a first security computer communicatively coupled with a client computer via an SSL connection, including a certificate creator, for receiving certificate attributes of a server computer certificate and for creating a signed certificate therefrom, and an SSL connector, for performing an SSL handshake with the client computer using the signed certificate created by said certificate creator, and a second security computer communicatively coupled with a server computer via an SSL connection, and communicatively coupled with the first security computer via a non-SSL connection, including an SSL connector, for performing an SSL handshake with the server computer using a signed certificate provided by the server computer, and a protocol appender, for appending attributes of the signed certificate provided by the server computer within a message communicated to the first security computer.

There is additionally provided in accordance with an embodiment of the present invention a method for secure communication, including forwarding, from a first security computer to a second security computer, a request from a client computer to connect to a server computer, establishing an SSL connection between the second security computer and the server computer, including performing, by the second security computer, an SSL handshake with the server computer using a signed certificate provided by the server computer, appending, by the second security computer, attributes of the signed certificate provided by the server computer within a message communicated to the first security computer, receiving, by the first security computer, certificate attributes of the server computer certificate, creating, by the first security computer, a signed certificate from the received certificate attributes of the server computer certificate, and establishing an SSL connection between the first security computer and the client computer, including performing an SSL handshake with the client computer using the signed certificate created by the creating.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to a communications network having an intermediary security gateway computer and one or more intermediary third party gateway computers, where the third party gateway computers do not need to inspect the data content they receive and send. Using embodiments of the present invention, the connection between a client and a server is split into two SSL connections, and two or more non-SSL connections. One of the two SSL connections is used for communication between the client and a first security gateway computer, and the other of the two SSL connections is used for communication between the server and a second security gateway computer. The two or more non-SSL connections are used for communications between a security gateway computer and a third party gateway computer, and for communications between two third party gateway computers.

The first and second security computers are operative cooperatively to authenticate signed certificates that are provided by the server during an SSL handshake. The second security computer transmits to the first security computer the certificate attributes received from the server, and the first security computer acts as a certificate authority, and creates a certificate for the client based on the attributes of the server certificate.

Figure 2:
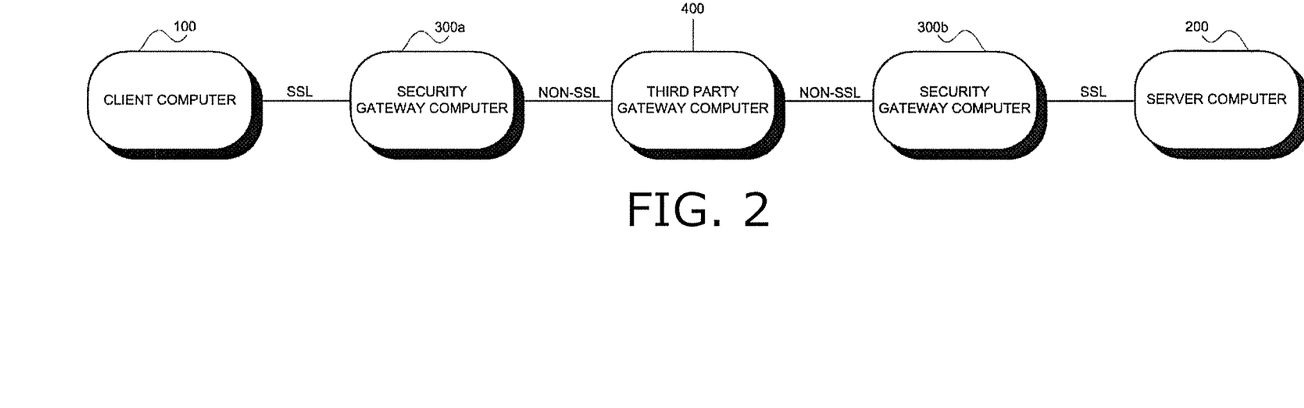
FIG. 2 is a diagram of a client-server system with two security gateways and a third party caching gateway, using only two SSL connections, in accordance with an embodiment of the present invention.

Reference is now made to FIG. 2, which is a diagram of a client-server system with two security gateways and a third party caching gateway, using only two SSL connections, in accordance with an embodiment of the present invention. Shown in FIG. 2 is a client computer 100 that communicates with a server computer 200 within a network in which a first security gateway computer 300a, a third party gateway computer 400, and a second security gateway computer 300b intermediate. Third party gateway computer 400 does not need to inspect the data content that it receives and sends. In some instances the data content passing through third party gateway computer 400 may need to be encrypted, and in other instances the data content may not need to be encrypted.

It will be appreciated by those skilled in the art in the ensuing description that embodiments of the present invention apply as well to a topology wherein third party gateway computer 400 is a plurality of networked third party gateway computers.

Notable in FIG. 2 is the use of two SSL connections and two non-SSL connections. As such, establishing a connection between client computer 100 and server computer 200 requires only two SSL handshakes. Specifically, security gateway computer 300a establishes an SSL connection with client computer 100, and security gateway computer 300b establishes an SSL connection with server computer 200. The connections between security gateway computer 300a and security gateway computer 300b are non-SSL connections, which are higher performance and lower latency connections than SSL connections.

Using the network topology of FIG. 2, client computer 100 and server computer 200 are still connected over SSL, and a certificate is exchanged and validated. If the communication between security gateway computers 300a and 300b is required to be encrypted, an encrypted tunnel/pipe is established between the security gateway computers, such as an Open-VPN tunnel. In cases where there are many connections between security gateway computers 300a and 300b, a permanent encrypted tunnel/pipe is established between them.

For the network topology of FIG. 2 to support SSL certificate validation, security gateway computers 300a and 300b perform special processing, as described hereinbelow regarding the methods of FIGS. 3 and 4.

Figure 3:
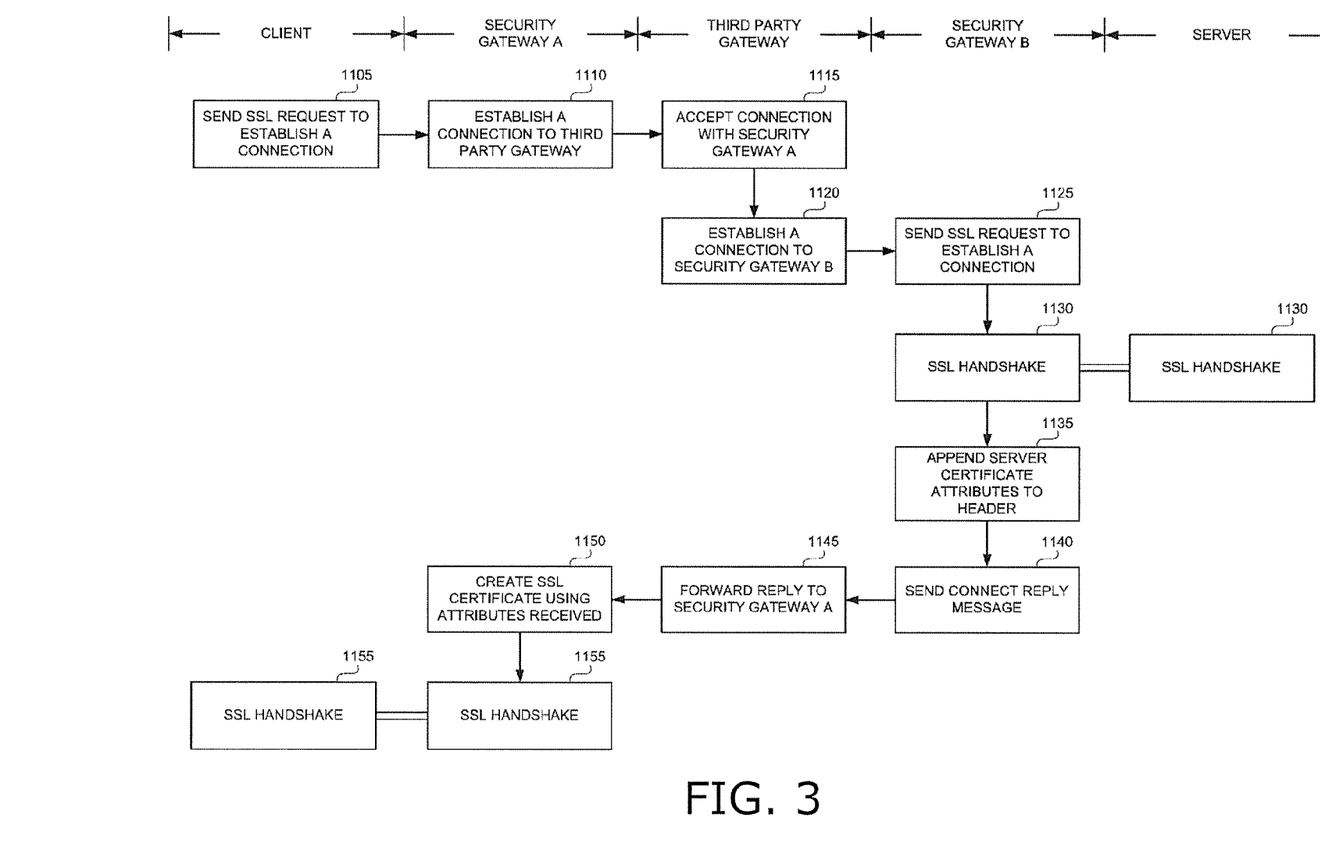
FIG. 3 is a simplified flowchart of a method for establishing an SSL connection between a client and server computer, when a security gateway computer and a third party gateway computer intermediate between the client and the server computers, in accordance with an embodiment of the present invention.

Reference is now made to FIG. 3, which is a simplified flowchart of a method for establishing an SSL connection between a client and server computer, when a security gateway computer and a third party gateway computer intermediate between the client and the server computers, in accordance with an embodiment of the present invention. The flowchart of FIG. 3 is divided into five columns. Starting from the left, the first column includes steps performed by client computer 100 ("client"), the second column includes steps performed by security gateway computer 300a ("security gateway A"), the third column includes steps performed by third party gateway computer 400 ("third party gateway"), the fourth column includes steps performed by security gateway computer 300b ("security gateway B"), and the fifth column includes steps performed by server computer 200 ("server").

At step 1105, the client computer sends an SSL request to security gateway A, to establish a connection, using the CONNECT request method. At step 1110 security gateway A establishes a connection to the third party gateway. If an encrypted connection is desired, then security gateway A establishes an encrypted connection to the third party gateway using, for example, Open-VPN. If subsequent connection requests are anticipated, then the connection between security gateway A and the third party gateway remains as a tunnel/pipe, in order not to disconnect.

At step 1115 the third party gateway accepts the connection with security gateway A. At step 1120 the third party gateway establishes a connection to security gateway B. As above, if an encrypted connection is desired, then the third party gateway establishes an encrypted connection to security gateway B using, for example, Open-VPN. Also as above, if subsequent connection requests are anticipated, then the connection between the third party gateway and security gateway B remains as a tunnel/pipe, in order not to disconnect.

At step 1125 security gateway B sends an SSL request to the server, to establish a connection, using the CONNECT request method. At step 1130 security gateway B and the server perform an SSL handshake to authenticate a server certificate. Upon success of the handshake, an SSL connection is established between security gateway B and the server. At step 1135 security gateway B appends the server certificate attributes to a header in the protocol, such as an HTTP reply header. Certificate attributes generally include inter alia a domain name and a validity date.

At step 1140 security gateway B replies to the third party gateway with a CONNECT reply message. The reply includes the server certificate attributes in its header. At step 1145 the third party gateway forwards the reply received from security gateway B to security gateway A.

At step 1150 security gateway A creates an SSL certificate using the attributes of the server certificate. Finally, at step 1155 security gateway A and the client perform an SSL handshake to authenticate the certificate created by security gateway A. Upon success of the handshake, an SSL connection is established between security gateway A and the client. At this stage, subsequent requests from the client to the server may be communicated over the established connections.

In accordance with an embodiment of the present invention, the method of FIG. 3 may be enhanced by maintaining a local certificate cache at security gateway A. Such a cache obviates the need for security gateway B to send the server certificate attributes to security gateway A. Instead, a cached server certificate is used. However, certificates often expire and are renewed. In order that the certificate cache at security gateway A be up-to-date, security gateway B sends updated server certificates to security gateway A when the server certificates change.

Figure 4A:
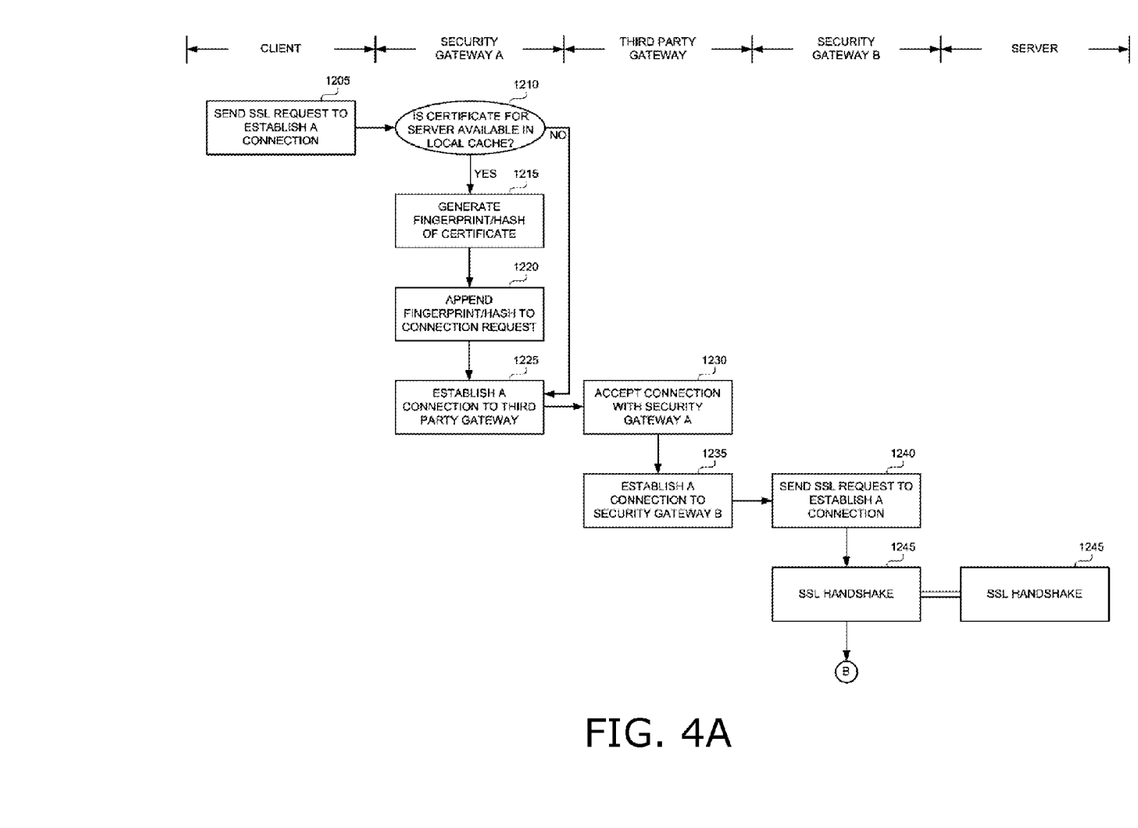
FIGS. 4A and 4B are simplified flowcharts of an enhancement for the method of FIG. 3, using a certificate cache, in accordance with an embodiment of the present invention.
Figure 4B:
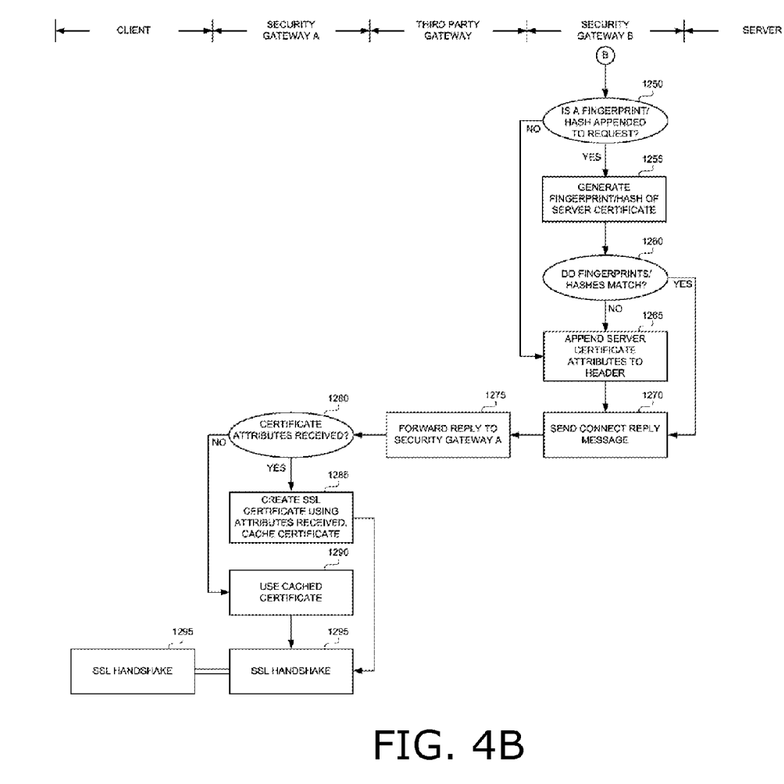

In this regard, reference is now made to FIGS. 4A and 4B, which are a simplified flowchart of an enhancement for the method of FIG. 3, using a certificate cache, in accordance with an embodiment of the present invention. The flowchart of FIGS. 4A and 4B is divided into five columns, as described above with reference to FIG. 3.

At step 1205 the client sends an SSL request to security gateway A, to establish a connection, using the CONNECT request method. At step 1210 security gateway A checks its local certificate cache to determine if a certificate for the requested server name is already available in cache. If so, then at step 1215 security gateway A generates a fingerprint or hash of the server certificate, and at step 1220 security gateway A appends the fingerprint/hash to a connection request. Otherwise, if it is determined at step 1210 that a certificate for the requested server name is not available in cache, then processing advances directly to step 1225, by-passing steps 1215 and 1220.

At step 1225 security gateway A establishes a connection to the third party gateway. The connection request will include the fingerprint/hash of the server certificate if steps 1215 and 1220 were performed. If encryption between security gateway A and the third party gateway is desired, then an encrypted connection is established, using, for example, Open-VPN. If subsequent requests are anticipated, then the connection between security gateway A and the third party gateway remains as a tunnel/pipe, in order that it not disconnect.

At step 1230 the third party gateway accepts the connection with security gateway A. At step 1235 the third party gateway establishes a connection to security gateway B. The connection request received by security gateway B from the third party gateway will include the fingerprint/hash of the server certificate if steps 1215 and 1220 were performed. As above, if encryption between the third party gateway and security gateway B is desired, then an encrypted connection is established, using, for example, Open-VPN. Also as above, if subsequent requests are anticipated, then the connection between the third party gateway and security gateway B remains as a tunnel/pipe, in order that it not disconnect.

At step 1240 security gateway B sends an SSL request to the server, to establish a connection, using the CONNECT request method. At step 1245 security gateway B and the server perform an SSL handshake to authenticate a server certificate. Upon success of the handshake, an SSL connection is established between security gateway B and the server.

At step 1250 security gateway B determines whether a fingerprint/hash of the server certificate was included in the request made at step 1235. If so, then at step 1255 security gateway B generates a fingerprint or hash of the certificate it received from the server during the SSL handshake at step 1245. At step 1260 security gateway B compares the fingerprint/hash received at step 1235 with the fingerprint/hash generated at step 1255. If the two fingerprints/hashes do not match, then the server certificate was recently updated, and the server certificate cached at security gateway A is no longer valid. At step 1265 security gateway B appends the certificate attributes from the server certificate received at step 1245, to a header in the protocol, such as an HTTP reply header. Otherwise, if the two fingerprints/hashes compared at step 1260 do match, then the server certificate cached at security gateway A is still valid. In this case, processing advances directly to step 1270, by-passing step 1265, and no certificate attributes are appended to the reply message.

If security gateway B determines at step 1250 that a fingerprint/hash was not included in the request received at step 1235, then processing advances directly to step 1265, by-passing steps 1255 and 1260.

At step 1270 security gateway B replies to the third party gateway with a connection reply message. At step 1275 the third party gateway forwards the reply received from security gateway B to security gateway A.

At step 1280 security gateway A determines whether server certificate attributes are included in the reply message received from the third party gateway computer at step 1275. If so, then at step 1285 security gateway A creates an SSL certificate using the attributes included in the reply message, and stores the created certificate in its local cache for subsequent access. Otherwise, at step 1290 security gateway A retrieves its cached certificate.

Finally, at step 1295 security gateway A and the client perform an SSL handshake to authenticate the certificate created at step 1285 or the cached certificate, as appropriate. Upon success of the SSL handshake, an SSL connection between gateway server A and the client is established. At this stage, subsequent requests from the client to the server are communicated over the established connections.

Figure 5:
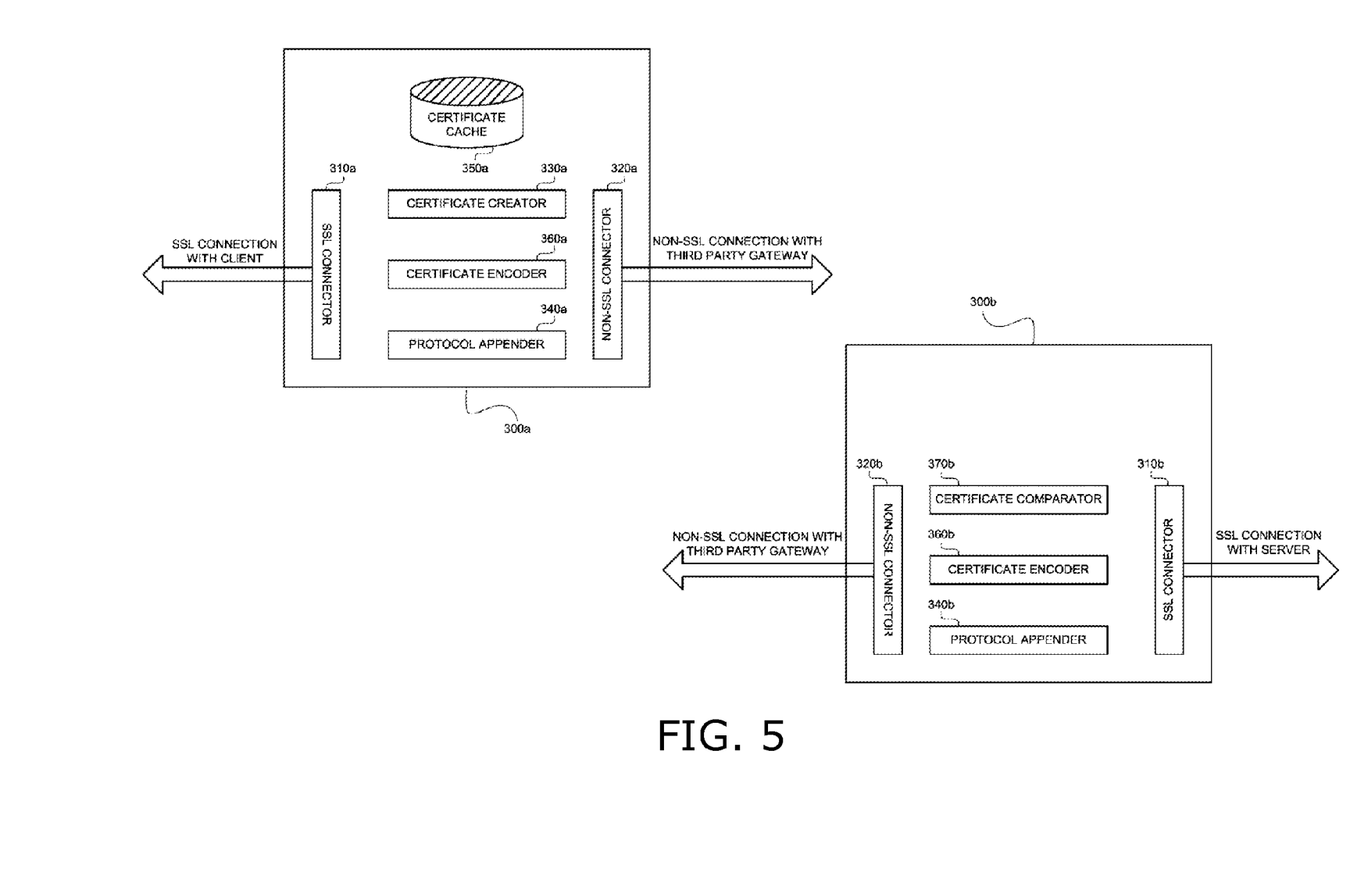
FIG. 5 is a simplified block diagram of security gateway computers that cooperate in SSL certificate validation, in accordance with an embodiment of the present invention.

Reference is now made to FIG. 5, which is a simplified block diagram of security gateway computers 300a and 300b that cooperate in SSL certificate validation, in accordance with an embodiment of the present invention. Security gateway computers 300a and 300b are operative to perform the steps in FIGS. 3, 4A and 4B that apply to security gateways A and B, respectively. In addition to the components shown in FIG. 5, each of security gateway computers 300a and 300b includes standard computer hardware (not shown), including inter alia one or more processors, one or more hard disk drives, RAM, a communication bus, one or more network interfaces, and I/O drivers including inter alia drivers for a keyboard, a mouse and a graphical display.

As shown in FIG. 5, security gateway computer 300a includes an SSL connector 310a, for establishing an SSL connection between security gateway computer 300a and a client computer. SSL connector 310a is used in performing step 1155 of FIG. 3 and step 1295 of FIG. 4B. Security gateway computer 300a also includes a non-SSL connector 320a, for establishing a non-SSL encrypted or non-encrypted connection between security gateway computer 300a and a third party gateway computer. Non-SSL connector 320a is used in performing step 1110 of FIG. 3 and step 1225 of FIG. 4A. Security gateway computer 300a also includes a certificate creator 330a, for creating a signed certificate for attributes of a server certificate. Certificate creator 330a is used in performing step 1150 of FIG. 3 and step 1285 of FIG. 4B.

Security gateway computer 300b includes an SSL connector 310b, for establishing an SSL connection between security gateway computer 300b and a server computer. SSL connector 310b is used in performing step 1130 of FIG. 3 and step 1245 of FIG. 4A. Security gateway computer 300b also includes a non-SSL connector 320b, for establishing a non-SSL encrypted or non-encrypted connection between security gateway computer 300b and a third party gateway computer. Non-SSL connector 320b is used in performing step 1120 of FIG. 3 and step 1235 of FIG. 4. Security gateway computer 300b also includes a protocol appender 340b, for appending certificate attributes within a protocol request. Protocol appender 340b is used in performing step 1135 of FIG. 3 and step 1265 of FIG. 4B.

For use in the enhanced method of FIGS. 4A and B, security gateway computer 300a also includes a local certificate cache 350a for storing and retrieving attributes of signed server certificates. In addition, security gateway computer 300a includes a certificate encoder 360a for deriving a hash value for cached certificate attributes, and a protocol appender 340a for appending the hash value to a protocol message. Certificate encoder 360a is used in performing step 1215 of FIG. 4A, and protocol appender 340a is used in performing step 1220 of FIG. 4A.

Further for use in the enhanced method of FIGS. 4A and B, security gateway computer 300b also includes a certificate encoder 360b for deriving a hash value for attributes of a certificate provided by the server computer, and a certificate comparator 370b for comparing hash values generated by certificate encoder 360a with a hash value generated by certificate encoder 360b. Certificate encoder 360b is used in performing step 1255 of FIG. 4B, and certificate comparator 370b is used in performing step 1260 of FIG. 4B.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system for secure communication, comprising:
   a first security computer comprising:
      a certificate creator, (i) for receiving attributes of a server computer's signed certificate within a reply message generated by a second security computer and communicated to the first security computer, the signed certificate being used to authenticate the server computer, and (ii) for creating a proxy signed certificate from the received attributes;
      a certificate cache for storing and retrieving the attributes of the server computer's signed certificate; and
      a first SSL connector, for connecting to a client computer and for performing a first SSL handshake with the client computer using the proxy signed certificate created by said certificate creator; and
   a second security computer communicatively coupled with said first security computer via a non-SSL connection for receiving a connection request message therefrom, the connection request message including cached attributes of the signed certificate, comprising:
      a second SSL connector, for connecting to the server computer, for receiving current attributes of the signed certificate from the server computer, for performing a second SSL handshake with the server computer using the signed certificate, and for generating the reply message communicated to said first security computer in response to the connection request message;
      a certificate comparator for comparing the cached attributes of the signed certificate with the current attributes of the signed certificate; and
      a protocol appender, for appending the current attributes of the signed certificate within the reply message communicated to said first security computer, when said certificate comparator determines that the cached attributes of the signed certificate do not match the current attributes of the signed certificate.

2. The system of claim 1 wherein said first security computer further comprises:
   a certificate encoder for deriving a hash value of the cached attributes of the signed certificate; and
   a protocol appender, for appending the hash value derived by said first security computer certificate encoder within a request message communicated to said second security computer,
   wherein said second security computer further comprises a certificate encoder for deriving a hash value for the current attributes of the signed certificate,
   wherein said certificate comparator compares the hash value within the request message with the hash value derived by said second security computer certificate encoder, and
   wherein said second security computer protocol appender appends the current attributes of the signed certificate to the reply message when said certificate comparator determines that the hash value within the request message does not match the hash value derived by said second security computer certificate encoder.

3. The system of claim 1 wherein said first and said second security computers are network gateway computers.

4. The system of claim 1 wherein said first security computer and said second security computer communicate using an unencrypted connection that goes through at least one other computer.

5. The system of claim 4 wherein the at least one other computer includes a network gateway caching computer.

6. The system of claim 1 wherein said first security computer and said second security computer communicate using an encrypted connection that goes through at least one other computer.

7. The system of claim 6 wherein the encrypted connection is an Open-VPN connection.

8. The system of claim 6 wherein the at least one other computer includes a network gateway caching computer.

9. The system of claim 1 wherein certificate attributes include a domain name.

10. The system of claim 1 wherein certificate attributes include a validity date.

* * * * *